Patented June 15, 1954

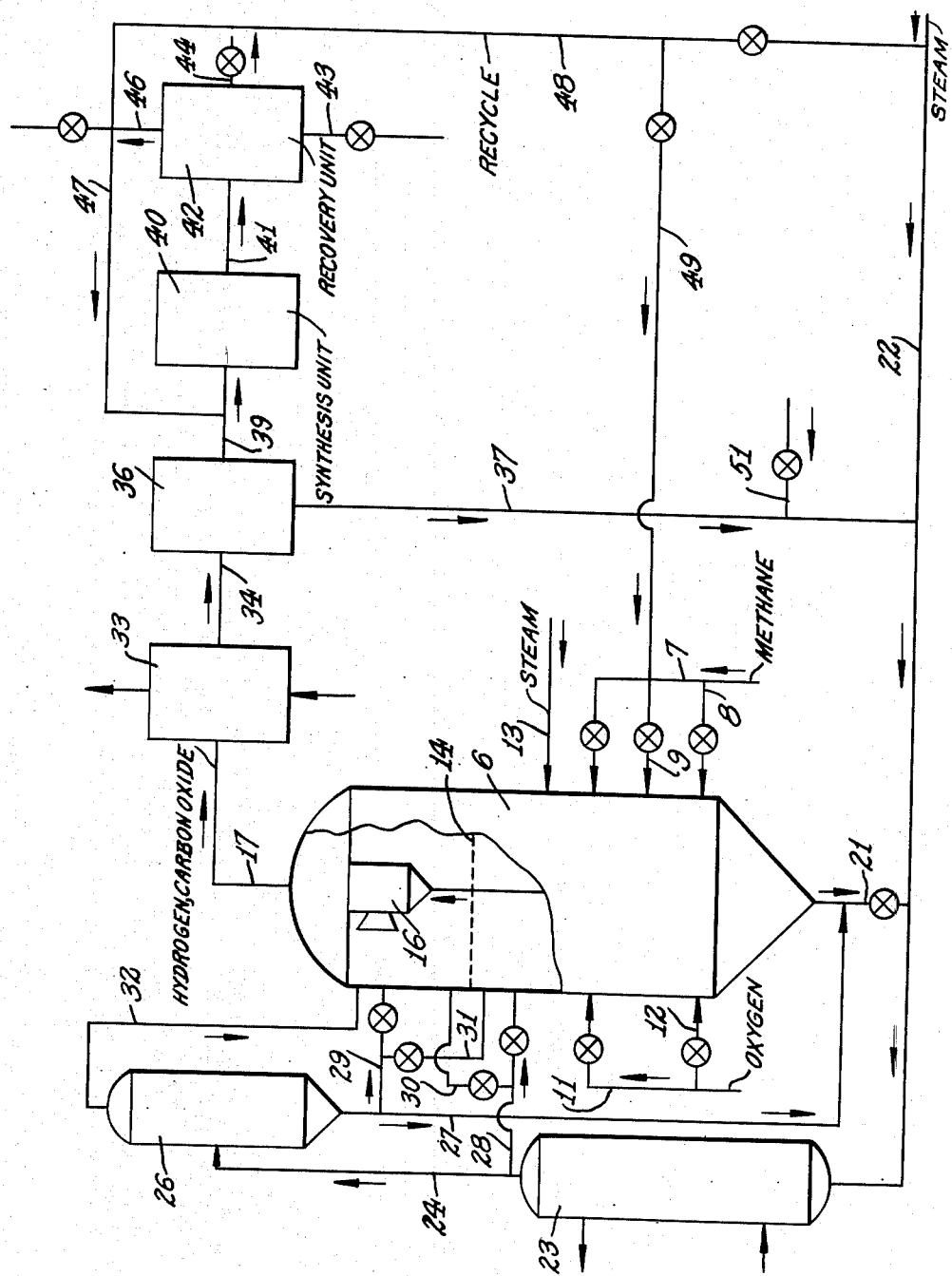

2,681,272

UNITED STATES PATENT OFFICE 2,681,272

METHOD FOR MANUFACTURE OF A GAS RICH IN HYDROGEN

Joseph W. Jewell, Summit, N. J., assignor to The M. W. Kellogg Company, Jersey City, N. J., a corporation of Delaware Application January 10, 1948, Serial No. 1,628

2 Claims. (Cl. 48—196)

This invention relates to the method and apparatus for manufacture of a gas rich in hydrogen. In one aspect this invention relates to manufacture of a gaseous mixture of hydrogen and carbon monoxide. In another aspect this invention relates to an integrated process involving the production of hydrogen and an oxide of carbon and the subsequent interaction of the hydrogen and oxide of carbon to produce organic compounds as products of the process.

It has been known for some time that a gaseous mixture comprising hydrogen and carbon monoxide in relatively large proportions may be produced by the reaction of steam and/or carbon dioxide with methane and by the partial combustion of methane. The partial combustion of methane with oxygen as well as the reaction of methane with carbon dioxide to produce hydrogen and carbon monoxide produces these components in a relatively low ratio with respect to each other, usually in a mol ratio less than about 2:1 at a temperature between about 1800 and about 2500° F. The production of hydrogen and carbon monoxide by the reaction between methane and steam produces these components in a mol ratio above about 3:1 at a temperature between about 1250 and about 2400° F. Either of the above reactions may be effected with or without a catalyst. The synthesis of organic compounds from such a gaseous mixture comprising hydrogen and carbon monoxide has been effected in the presence of a catalyst, such as a metal or a metal oxide of group VIII of the periodic table. Generally, the mol ratio of hydrogen to carbon monoxide in the feed gas for the synthesis of organic compounds in the presence of such a catalyst is between 1:1 and about 4:1, preferably a ratio of about 2:1.

Each of the above methods for producing hydrogen and carbon monoxide in relatively large proportions have certain inherent disadvantages.

In the partial combustion of methane with oxygen, excess oxygen, which goes to water, is required to prevent or minimize carbon formation. High temperatures are also required and temperature control is extremely difficult as accurate observation of the exact temperature is substantially impossible.

In the reforming of methane with steam, heat must be supplied to the endothermic reaction. This is accomplished by means of externally supplied heat, such as by a conventional reforming furnace in which a suitable fuel is burned. The use of a furnace in the reforming operation has its obvious disadvantages. One of these disadvantages is the fact that relatively low pressures must be used in the reforming furnace because of limitation in the strength of construction materials at an economic temperature, such economic temperature being that temperature at which equilibrium is favorable to a high yield of hydrogen and carbon monoxide. Moreover, the indirect application of heat to the reforming reaction reduces the efficiency of the reforming operation.

It is an object of this invention to overcome such inherent difficulties in the reforming operation and to provide a method for producing a gas comprising hydrogen and carbon monoxide in a mol ratio of about 2:1.

Another object of this invention is to provide a more economic process for the production of a synthesis feed gas having relatively large proportions of hydrogen and an oxide of carbon.

Still another object of this invention is to provide a method and apparatus for producing a synthesis feed gas at relatively high pressures by the reforming of methane.

It is another object of this invention to provide an integrated process for the conversion of a normally gaseous hydrocarbon into hydrogen and an oxide of carbon and the subsequent conversion of the oxide of carbon and hydrogen to hydrocarbons having more than one carbon atom per molecule and oxygenated organic compounds.

Various other objects and advantages of the present invention will become apparent to those skilled in the art from the accompanying description and disclosure.

It is believed that this invention may be best understood and described by reference to the accompanying drawing which shows a diagrammatic arrangement of apparatus in elevation and partly in cross-section for the manufacture of a gas rich in hydrogen and carbon monoxide and its subsequent use for the synthesis of organic compounds. Although the invention, as described with reference to the drawing, relates to the synthesis of organic compounds, such application of the hydrogen-rich gas should not be considered unnecessarily limiting to the invention.

In accordance with the illustration in the drawing, methane or a methane-containing gas from any suitable source, such as natural gas, after removal of hydrogen sulfide and other detrimental sulfur compounds therefrom by conventional methods, is passed under pressure through conduits 7, 8 and 9 into a cylindrical elongated reaction chamber 6 positioned substantially vertically. Although methane is referred to specifically as the feed, the use of other gaseous hydrocarbons, such as ethane and propane, is within the scope of this invention. Oxygen of suitable purity, preferably of about 85 to about 95 per cent purity, is passed to reactor 6 through conduits 11 and 12. Reactor 6 contains a mass of finely-divided contact material such as a nickel or nickel oxide catalyst, or a suitable heat carrying refractory material such as Alundum. The oxygen and methane gas streams intimately mix and pass upwardly in reactor 6 through the mass of finely-divided contact material at a linear gas velocity sufficient to suspend the finely-divided contact material in a pseudo-liquid condition. The catalyst mass may be said to be suspended in the gas stream but not entrained therein in the sense that there is movement of the catalyst mass as such in the direction of flow of the gas stream. In this pseudo-liquid condition it is preferred to maintain the upward velocity of the gas stream sufficiently high to maintain the fluidized catalyst mass in a highly turbulent condition in which the particles circulate at a high rate within the pseudo-liquid mass.

With the contact material in a pseudo-liquid condition in reactor 6, the size of the reactor is substantially longer than that required by the contact or catalyst mass in the fluidized condition. In this manner of operation all but a minor proportion of the catalyst mass is contained in the dense fluidized pseudo-liquid mass, which may be designated as the dense phase of the catalyst. This dense phase of catalyst or heat carrying material occupies the lower part of the reactor while that part of the reactor above the dense phase is occupied by a mixture of gases and powdered catalyst in which the catalyst concentration is much lower, and of a different order of magnitude than the concentration of the catalyst in the dense phase. This diffuse phase may be said to be a disengaging or settling zone in which solids lifted above the dense phase by the gas stream are disengaged therefrom and returned to the dense phase to the extent that such solids are present in the diffuse phase in excess of the carrying capacity of the gas stream at the linear velocity thereof. In the dense phase the concentration of catalyst in the gas stream varies from a maximum near the gas inlet of reactor 6 to a minimum in the upper part of this dense phase. Likewise, the concentration of the catalyst in the diffuse phase varies from a maximum near the upper surface of the dense phase to a minimum in the upper part of reactor 6. Between the dense phase of high average concentration and the diffuse phase of low average concentration, there is a relatively narrow zone in which the concentration of solids in the gas stream changes in a short space from the high concentration of the dense phase to the low concentration of the diffuse phase. This zone has the appearance of an interface between two visually distinct phases and is designated by numeral 14.

This dense phase or pseudo-liquid method of operation ordinarily involves employment of solid powders and linear gas velocities such that a relatively small proportion of the fluidized material is carried away by entrainment and it is necessary, therefore, to provide means in reactor 6, such as a cyclone separator 16, for separating entrained material and returning it to the dense phase, and/or to provide means externally of reactor 6, such as a Cottrell precipitator or a liquid scrubber 36, to separate entrained contact material from the gaseous effluent and return it to reactor 6, or otherwise to recover solid material from the gaseous effluent.

The contact material is employed in a fine state of subdivision. Preferably, the powdered contact material initially contains no more than a minor proportion by weight of material whose particle size is greater than 250 microns. The greater proportion of the catalyst mass comprises material whose particle size is smaller than 100 microns, including at least 25 weight per cent of material in particle size smaller than 40 microns. The specific fineness of the contact material required for any operation is determined by such factors as operating pressure and specific gravity of the solids.

The linear velocity of the gas stream passing upward through the dense phase is in the range between about 0.1 to about 6 feet per second. The density or concentration of the contact material in the dense phase will vary and depend upon such factors as density of the particles of contact material which in turn depends upon the support used to carry the catalytically active material, the linear gas velocity, etc. Generally, the density or concentration of the contact material in the dense phase is between about 20 and about 120 pounds per cubic foot of gas.

In the lower portion of reactor 6 oxygen and methane are combusted to produce hydrogen and carbon monoxide and some carbon dioxide and water. It is preferred to effect this combustion at a temperature between about 1200 and about 1800° F. depending on the operating pressure. The oxygen and methane are generally preheated to a temperature of about 800° F. and 1000° F., respectively. The introduction of both oxygen and methane at a plurality of points longitudinally along reactor 6 aids in minimizing local overheating and assures adequate mixing and distribution of the reactants. As the gas stream passes upward to the upper portion of the dense phase in reactor 6, additional methane is introduced therein through conduit 7 and steam is introduced therein through conduit 13. In the upper portion of the dense phase of reactor 6, preferably the upper one third, steam and methane are endothermically reacted to produce hydrogen and carbon monoxide. Due to the high rate of internal circulation of the contact material in the dense phase of reactor 6, the temperature gradient between the upper portion and the lower portion of the dense phase will be minimum. A pressure between atmospheric and about 300 pounds per square inch gage, preferably below 200 pounds to minimize the amount of methane in the product gas, is maintained on reactor 6. The upper pressure limit depends upon the product composition desired and on the mechanical limitations of reactor 6 which may be internally insulated to assure maximum strength at a given temperature.

The present invention provides a method of using a catalyst and heat transfer material, or a heat transfer material, which absorbs heat from the exothermic combustion of methane with oxygen in the lower portion of the dense phase and transfers the absorbed heat to the endothermic reforming reaction between methane and steam in the upper portion of the dense phase where the heat is utilized at a lower temperature level, e. g. 100 or 300° F. lower than the combustion temperature depending on the rate of circulation of the catalyst particles. In this manner of operation temperatures may be used which are as much as 500 or 1000° F. lower than those temperatures used in conventional methane combustion processes (combustion alone) for producing hydrogen and carbon monoxide. The use of lower temperatures results in greatly increased efficiency because substantially 100 per cent efficient heat transfer is obtained between the exothermic combustion reaction and the endothermic reforming reaction. However, higher temperatures up to the maximum dictated by the mechanical strength of the reactor may be used without departing from the scope of this invention. The present system is particularly adaptable to the use of a catalyst which increases the capacity of the equipment as the result of higher space velocities.

The quantity of methane introduced into reactor 6 is determined by the carbon requirement (carbon monoxide) of the gas product. The relative quantities of oxygen and steam and/or carbon dioxide introduced into reactor 6 are determined by a heat balance between the methane-oxygen reaction and the methane-steam and/or carbon dioxide reaction at a given temperature level. Generally, the mol ratio of oxygen to total methane introduced into reactor 6 is between about 0.48 and about 0.55. Carbon dioxide may be employed to replace a portion of the steam in the steam-methane reaction, such as by recycling gases from recovery unit 42 to be discussed more fully hereinafter.

As a means of controlling the temperature in reactor 6 when excess heat is liberated by methane combustion, contact material is withdrawn therefrom by means of standpipe 21 and introduced into conduit 22 where it is entrained by a stream of steam or recycle gas and passed through a conventional catalyst cooler 23. The catalyst may be cooled in cooler 23 by either indirect or direct contact with a cooling medium. For example, the catalyst may be indirectly heat exchanged with water or steam or the catalyst may be directly contacted with a fluid, such a steam, which is later separated from the cooled catalyst. In cooler 23 the gas stream containing suspended contact material is cooled to a temperature substantially lower than the temperature existing in reactor 6, preferably a temperature at least 300° F. lower than the temperature of reactor 6. The cooled stream of gases and entrained contact material is then passed from cooler 23 through conduit 24 and thence either to separator 26 or directly through conduit 28 to the dense phase or through conduits 28 and 30 to the dilute phase of reactor 6. Separator 26 may be any type of conventional separator for separating gases and finely-divided contact material, such as a cyclone separator of a settling chamber. Gases from the top of separator 26 may be passed directly to reactor 6 through conduit 32 or may be passed to separate equipment, such as a condenser, when steam is used. Separated contact material is returned to the dilute phase of reactor 6 through standpipe 29 or part may be recycled through standpipe 27 for temperature control of the hot contact material in standpipe 21. If desired, separated contact material in standpipe 29 may be injected into the dense phase of reactor 6 by means of standpipe 31.

In order to decrease the cost of internally lining standpipe 21 and the use of expensive high temperature valves, means must be provided for lowering the temperature of the catalyst immediately upon removal from the dense phase of reactor 6. This is accomplished according to a modification of this invention by injecting cooled contact material at a temperature substantially lower than the contact material withdrawn from reactor 6 directly into standpipe 21 at or adjacent the outlet from reactor 6. By continuously recycling a portion of the contact material from reactor 6 through cooler 23, adequate and full control of the temperature in standpipe 21 and reactor 6 is effected. Suitable aeration gas, such as steam, is introduced into the various standpipes to provide free flow of the solids therein.

A gaseous effluent comprising hydrogen, carbon monoxide, unreacted steam, methane and carbon dioxide, and containing a small proportion of entrained contact material is passed from reactor 6 through conduit 17 to a waste heat boiler 33. In waste heat boiler 33 the reaction effluent is cooled to a temperature below about 600° F. generating steam for subsequent use as power and as heat. From waste heat boiler 33 the reaction effluent is then passed to solids separator 36 as previously mentioned. Separator 36 may comprise a Cottrell precipitator or liquid scrubbing column for removal of entrained contact material. If a liquid scrubbing column is used for removal of entrained solids, the reaction effluent is cooled still further, usually to a temperature below about 200° F. depending on the pressure. When a Cottrell precipitator is employed, recovered contact material from separator 36 is passed through conduit or standpipe 37 to conduit 22 which returns it to reactor 6.

At this point the reaction effluent has approximately the composition shown in the table below when natural gas is the source of methane and when normally gaseous components of synthesis reactor 40 are recycled to conduit 7. It will be understood that the composition of the effluent will depend upon the operating conditions, the composition of the contact material, space velocity, etc.

Table

| | Mol Percent |
|---|---|
| $N_2$ | 1.0 |
| $H_2$ | 65.0 |
| CO | 25.0 |
| $CO_2$ | 4.5 |
| $CH_4$ | 4.5 |
| | 100.0 |

From separator 36 the reaction effluent comprising hydrogen and carbon monoxide in a mol ratio of about 2:1 is passed to a conventional synthesis reactor 40. Synthesis reactor 40 comprises any of several types of conventional reaction chambers, such as a fixed bed or a fluid-bed reaction chamber, and necessary auxiliary equipment known to those skilled in the art. Synthesis unit 40 may comprise a plurality of reactors in series or in parallel. The synthesis gas feed from conduit 39 is passed through synthesis unit 40 in contact with a suitable catalyst, such as iron or other metal or metal oxide of group VIII of the periodic table, under conditions of reaction known to those skilled in the art such that hydrocarbons having more than one carbon atom per molecule and oxygenated organic compounds are produced as products of the process. The temperature of reaction in synthesis unit 40 is generally between about 300 and about 750° F. and a pressure is maintained between about atmospheric and about 500 pounds per square inch gage. When employing iron or an iron oxide catalyst, a temperature between about 450 and about 650° F. is appropriate. When employing a cobalt catalyst a temperature below about 450° F. is employed. Sufficient contact time of reactants and reaction products with the catalyst material is afforded in synthesis unit 40 to produce the desired products. Usually a contact time of gases with catalyst of about 2 to 20 seconds is appropriate.

A synthesis reaction effluent comprising hydrocarbons, oxygenated organic compounds, steam, carbon dioxide, and unreacted reactants, including some methane is removed from synthesis unit 40 by means of conduit 41 and is passed to a conventional recovery unit 42. Recovery unit 42 comprises conventional equiment for cooling and condensing the synthesis effluent and suitable fractionation and/or extraction equipment for separation and recovery of the products of the process. The synthesis reaction effluent is usually cooled to a temperature below about 300° F., preferably below 100° F., in recovery unit 42. The normally gaseous or uncondensed components of the synthesis reaction effluent are removed from recovery unit 42 through conduit 46 and may be recycled in whole or in part to synthesis unit 40 through conduit 47, or may be passed in whole or in part through conduit 48 to conduit 22 or through conduit 49 to conduit 7. Water containing dissolved oxygenated organic compounds is removed from recovery unit 42 through conduit 44. These oxygenated organic compounds may be recovered from the water by conventional methods known to those skilled in the art. Hydrocarbons are removed from recovery unit 42 through conduit 43 for further treatment or for use as motor fuel, solvents, and chemical reactants. To prevent the build-up of nitrogen in the system a portion of the gases in conduit 46 may be vented therefrom.

The gases in conduit 48 contain a large proportion of unreacted methane and carbon dioxide which can be recycled to supplement the feed to reactor 6, such as through conduit 7. These recycle gases may also be introduced with the steam in conduit 13, if desired.

Contact material may be positively withdrawn from the upper portion of the dense phase and passed by external means, such as a standpipe or a Fuller-Kinyon Pump, to the lower portion of the dense phase in order to aid circulation of the contact material between the zones of exothermis and endothermic reaction without departing from the scope of this invention.

Fresh or regenerated catalyst is introduced into the system through conduit 51 or with the reactants in conduits 7, 11 and 13.

Operations according to the preferred reaction conditions of the present invention produces a gaseous effluent from reactor 6 containing hydrogen and carbon monoxide in a mol ratio between about 1.8:1 and about 3:1 and substantially free from methane with a saving of about 20 per cent oxygen as compared with conventional partial combustion processes. The invention also provides a method for positive control of the hydrogen to carbon monoxide ratio in the product gas which makes the process particularly adaptable to the synthesis of organic compounds.

Various other modifications and alterations of the apparatus and flow may be practiced by those skilled in the art without departing from the scope of this invention. Certain coolers, condensers, pumps and valves have been omitted from the drawing as a matter of convenience and clarity and their location and use will become obvious to those skilled in the art.

I claim:

1. A process for the production of a gaseous mixture comprising hydrogen and carbon monoxide in relatively large proportions which comprises passing reactants and products of reaction upward through a mass of finely-divided contact material in a reaction zone at a velocity sufficient to suspend said mass in a pseudo-liquid condition whereby a dense phase of contact material is formed, introducing oxygen and methane into the lower portion of said dense phase of contact material and reacting same to produce hydrogen and carbon monoxide, introducing methane and steam into the upper portion of said dense phase and reacting same to produce hydrogen and carbon monoxide, removing an effluent from said reaction zone comprising hydrogen and carbon monoxide as the product of the process, withdrawing a portion of hot contact material from the dense phase of said reaction zone, cooling said hot contact material withdrawn from said reaction zone to a temperature below the temperature of said dense phase, returning a portion of the cooled contact material to said reaction zone as a means of controlling the temperature of the dense phase of contact material therein, and admixing another portion of said cooled contact material with said withdrawn contact material adjacent the point of withdrawal.

2. A process for effecting an exothermic chemical reaction which comprises passing reactants and products of reaction upward through a mass of finely divided contact material at an elevated temperature in a reaction zone at a velocity sufficient to suspend said mass in a pseudo-liquid condition whereby a dense phase of contact material is formed, removing an effluent from said reaction zone comprising products of the reaction, withdrawing a portion of hot contact material from the dense phase of said reaction zone, cooling said hot contact material withdrawn from said reaction zone to a temperature below the temperature of said dense phase, returning a portion of the cooled contact material to said reaction zone as a means of controlling the temperature of the dense phase of contact material therein and admixing another portion of said cooled contact material with said withdrawn contact material adjacent the point of withdrawal.

References Cited in the file of this patent

UNITED STATES PATENTS

| Number | Name | Date |
|--------|------|------|
| 2,178,824 | Atwell | Nov. 7, 1939 |
| 2,324,172 | Parkhurst | July 13, 1943 |
| 2,358,039 | Thomas et al. | Sept. 12, 1944 |
| 2,373,008 | Becker | Apr. 3, 1945 |
| 2,425,754 | Murphree et al. | Aug. 19, 1947 |
| 2,482,187 | Johnson | Sept. 20, 1949 |

OTHER REFERENCES

Natta et al.: "La Chimica e l'Industria," vol. 19, pages 177–182 (1937).